US012670528B2

(12) United States Patent
Suto et al.

(10) Patent No.: US 12,670,528 B2
(45) Date of Patent: Jun. 30, 2026

(54) METHOD FOR DIGITAL ASSET TRANSACTIONS

(71) Applicant: International Business Machines Corporation, Armonk, NY (US)

(72) Inventors: Tiberiu Suto, Franklin, NY (US);
Shikhar Kwatra, San Jose, CA (US);
Nadiya Kochura, Bolton, MA (US);
Ayush Khandelwal, Cambridge, MA
(US); Jeremy R. Fox, Georgetown, TX
(US)

(73) Assignee: International Business Machines Corporation, Armonk, NY (US)

( * ) Notice: Subject to any disclaimer, the term of this
patent is extended or adjusted under 35
U.S.C. 154(b) by 709 days.

(21) Appl. No.: 17/936,063

(22) Filed: Sep. 28, 2022

(65) Prior Publication Data

US 2024/0104653 A1    Mar. 28, 2024

(51) Int. Cl.
*G06Q 40/04*          (2012.01)
*G06F 21/10*          (2013.01)
(Continued)

(52) U.S. Cl.
CPC ........... *G06Q 40/04* (2013.01); *G06F 21/105*
(2013.01); *G06Q 20/36* (2013.01);
(Continued)

(58) Field of Classification Search
CPC .... G06Q 40/04; G06Q 20/36; G06Q 20/3823;
G06Q 20/389; G06Q 20/401; G06F
21/105; H04L 9/3236; H04L 9/50
See application file for complete search history.

(56) References Cited

U.S. PATENT DOCUMENTS 7,552,429 B2    6/2009  Dettinger
7,788,181 B2    8/2010  Ben-Menahem
(Continued)

FOREIGN PATENT DOCUMENTS

CA          1315002 C      3/1993
CN       106682457 A       5/2017
EP         3396575 B1     10/2018

OTHER PUBLICATIONS

"IBM Licensing Explained Clearly for IT Professionals", Metrixdata
360, downloaded from the Internet on Jul. 1, 2022, 12 pages,
<https://metrixdata360.com/license-series/ibm-licensing-
overview/>.
(Continued)

*Primary Examiner* — Scott S Trotter
(74) *Attorney, Agent, or Firm* — Eric W. Chesley

(57)          ABSTRACT

A computer-implemented method for digital asset transaction is disclosed. The computer-implemented method includes determining that a licensed material was used to generate a digital asset. The computer-implemented method further includes generating a smart contract for the digital asset, wherein one or more terms of the smart contract are based, at least in part, on one or more license terms associated with the licensed material. The computer-implemented method further includes identifying a transaction request for the digital asset. The computer-implemented method further includes authenticating the digital asset. The computer-implemented method further includes executing, in response to authenticating the digital asset, the generated smart contract for the digital asset.

17 Claims, 14 Drawing Sheets

(51) Int. Cl.

| | | |
|---|---|---|
| *G06Q 20/36* | (2012.01) | |
| *G06Q 20/38* | (2012.01) | |
| *G06Q 20/40* | (2012.01) | |
| *H04L 9/00* | (2022.01) | |
| *H04L 9/32* | (2006.01) | |

(52) U.S. Cl.

CPC ....... *G06Q 20/3823* (2013.01); *G06Q 20/389* (2013.01); *G06Q 20/401* (2013.01); *H04L 9/3236* (2013.01); *H04L 9/50* (2022.05)

(56) References Cited

U.S. PATENT DOCUMENTS

| | | | |
|---|---|---|---|
| 8,091,142 B2 | 1/2012 | Liu | |
| 11,048,780 B2 | 6/2021 | Chui | |
| 2017/0103391 A1 | 4/2017 | Wilson, Jr. | |
| 2017/0116693 A1 | 4/2017 | Rae | |
| 2019/0057115 A1 | 2/2019 | Liu | |
| 2019/0279321 A1* | 9/2019 | Sheets | G06Q 50/184 |
| 2021/0035096 A1 | 2/2021 | Kamalsky | |
| 2021/0150003 A1 | 5/2021 | Smaiely | |
| 2021/0201310 A1 | 7/2021 | Moss-Pultz | |
| 2023/0260187 A1* | 8/2023 | Smith | H04L 9/50 |
| | | | 345/473 |
| 2023/0419283 A1* | 12/2023 | Le | G06Q 30/04 |
| 2024/0411286 A1* | 12/2024 | Balinsky | H04L 9/50 |

OTHER PUBLICATIONS

"Top 10 License Management Solution Companies—2019", CIO Applications, 17 pages, <https://license-management.cioapplications.com/vendors/toplicense-management-solution-companies.html>.

"What are smart contracts?", Hedera, downloaded from the Internet on Jul. 1, 2022, 7 pages, <https://hedera.com/learning/what-are-smart-contracts>.

Chojecki, Przemek, "A Beginner's Guide to NFT Crypto Art", Apr. 13, 2021, Updated May 3, 2022, 13 pages, <https://builtin.com/blockchain/nft-cryptoart-guide>.

* cited by examiner

200

250

600

Module 612

Physical Infrastructure
610

Module 614

640

650

660

700

Figure 7B:
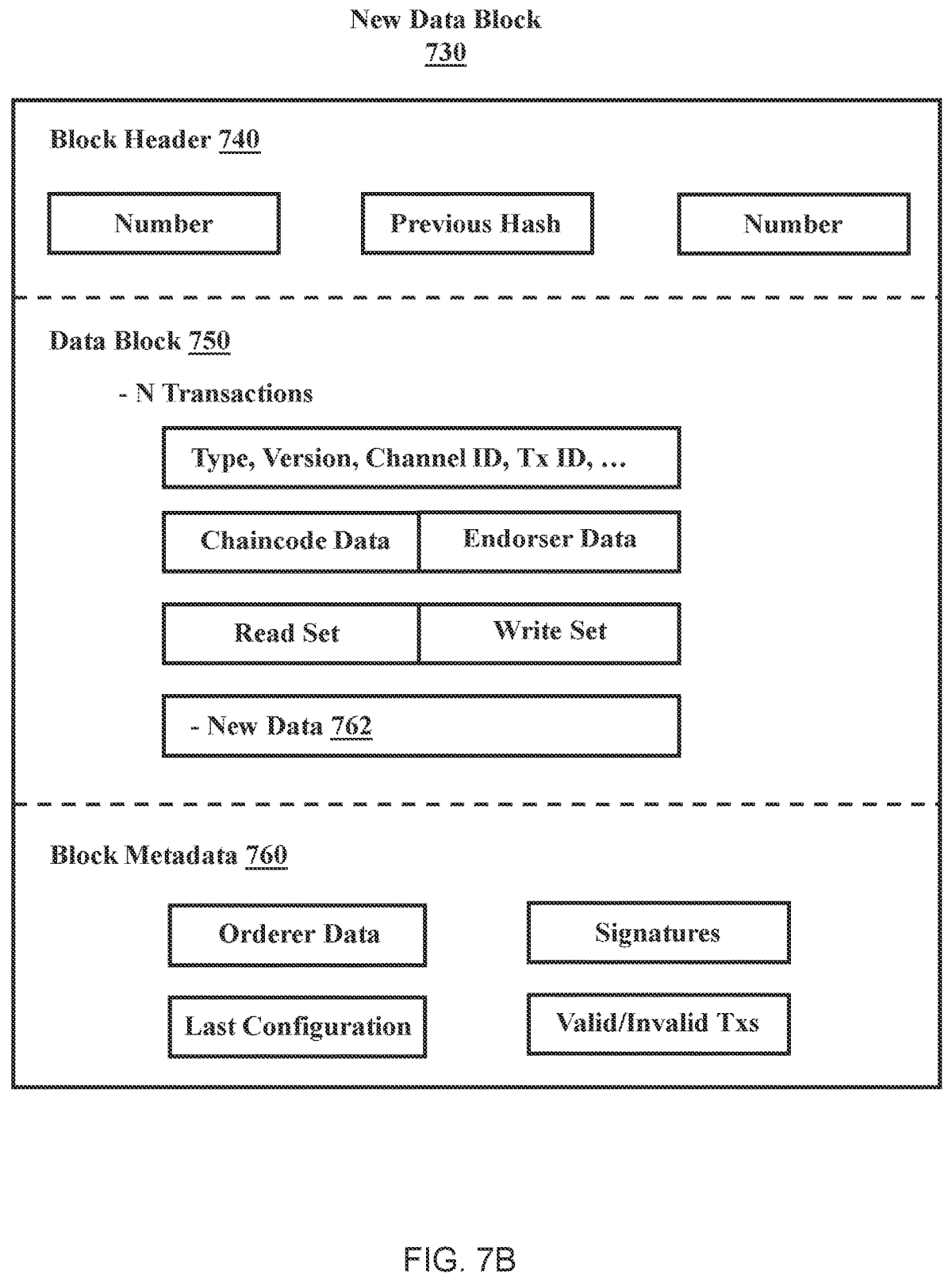

New Data Block
730

Block Header 740

| Number | Previous Hash | Number |

Data Block 750

- N Transactions

Type, Version, Channel ID, Tx ID, ...

| Chaincode Data | Endorser Data |

| Read Set | Write Set |

- New Data 762

Block Metadata 760

| Orderer Data | Signatures |

| Last Configuration | Valid/Invalid Txs |

Block$_j$

Header $772_j$

- Hash Value of Previous Block
- Reference Information

File(s) (and Metadata) $774_j$

| Data 1 | REF 1 | Metadata 1 |
|--------|-------|------------|
| Data 2 | REF 2 | Metadata 2 |
| . | . | . |
| . | . | . |
| . | . | . |
| . | . | . |
| . | . | . |
| Data N | REF N | Metadata N |

Value $776_j$ (based on one or more of)

- New Hash Value of File
- New Storage Location of File
- New Metadata Assigned to File
- Transfer Access/Control to New Blockchain Participant
- New/Existing/Change of Ownership of the File

FIG. 7D

METHOD FOR DIGITAL ASSET TRANSACTIONS

BACKGROUND

The present invention relates generally to the field of royalties for digital assets, and more particularly to, licensing royalties and authentication for digital assets.

Licensing is a business arrangement which gives one person or company permission to use or manufacture a product from the rightful owner, usually for a specified payment. Typically, the specified payment is a royalty. Royalties are usage-based payments for using an asset or property which can be in the form of a percentage for each usage or sale or a lump sum.

Blockchain is a shared, immutable ledger that facilitates the process of recording transactions and tracking assets in a business network. An asset can be tangible (a house, car, cash, land) or intangible (intellectual property, patents, copyrights, branding). A non-fungible token (NFT) is a record on a blockchain which is associated with a particular digital or physical asset. The ownership of an NFT is recorded in the blockchain, and can be transferred by the owner, allowing NFTs to be sold and traded. A smart contact is a computer program or a transaction protocol that is intended to automatically execute, control or document legally relevant events and actions according to the terms of a contract or an agreement. For example, when an NFT is transferred from one cryptocurrency wallet to another, the smart contract attached to the NFT is executed.

A cryptocurrency wallet is a device, physical medium, program or a service which stores the public and/or private keys for cryptocurrency transactions. A cryptocurrency wallet is accompanied by a public key and a private key. A public key works like an email address, meaning it can safely share it with others, allowing you to send or receive assets. However, a private key a secure code that enables the holder of a digital asset to make transactions and prove ownership of their digital assets. A private key is typically a string of letters and numbers.

SUMMARY

According to one embodiment of the present invention, a computer-implemented method for a digital asset transaction is disclosed. The computer-implemented method includes determining that a licensed material was used to generate a digital asset. The computer-implemented method further includes generating a smart contract for the digital asset, wherein one or more terms of the smart contract are based, at least in part, on one or more license terms associated with the licensed material. The computer-implemented method further includes identifying a transaction request for the digital asset. The computer-implemented method further includes authenticating the digital asset. The computer-implemented method further includes executing, in response to authenticating the digital asset, the generated smart contract for the digital as set.

According to another embodiment of the present invention, a computer program product for a digital asset transaction is disclosed. The computer program product includes one or more computer readable storage media and program instructions stored on the one or more computer readable storage media. The program instructions include instructions to determine that a licensed material was used to generate a digital asset. The program instructions further include instructions to generate a smart contract for the digital asset, wherein one or more terms of the smart contract are based, at least in part, on one or more license terms associated with the licensed material. The program instructions further include instructions to identify a transaction request for the digital asset. The program instructions further include instructions to authenticate the digital asset. The program instructions further include instructions to execute, in response to authenticating the digital asset, the generated smart contract for the digital asset.

According to another embodiment of the present invention, a computer system for a digital asset transaction is disclosed. The computer system includes one or more computer processors, one or more computer readable storage media, and computer program instructions, the computer program instructions being stored on the one or more computer readable storage media for execution by the one or more computer processors. The program instructions include instructions to determine that a licensed material was used to generate a digital asset. The program instructions further include instructions to generate a smart contract for the digital asset, wherein one or more terms of the smart contract are based, at least in part, on one or more license terms associated with the licensed material. The program instructions further include instructions to identify a transaction request for the digital asset. The program instructions further include instructions to authenticate the digital asset. The program instructions further include instructions to execute, in response to authenticating the digital asset, the generated smart contract for the digital asset.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 7B illustrates contents of a new data block, in accordance with at least one embodiment of the present disclosure.

FIG. 7D illustrates a block which may represent the structure of blocks in the blockchain, in accordance with at least one embodiment of the present disclosure.

Figure 1:
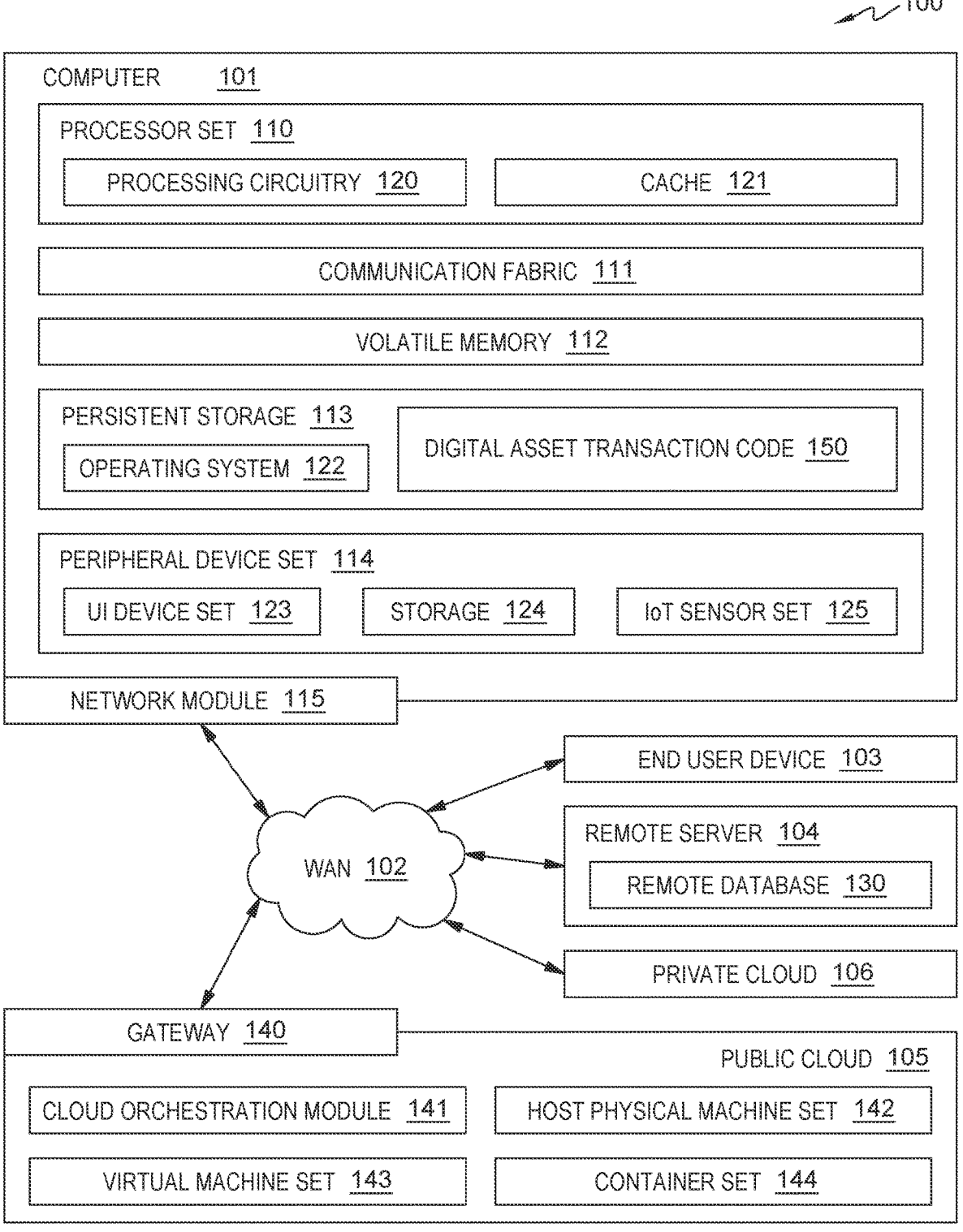
FIG. 1 is a functional block diagram of computing environment, generally designated 100, suitable for the execution of at least some of the computer code involved in performing the inventive methods, such as digital asset transaction code 150, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of royalties for digital assets, and more particularly to, licensing royalties and authentication for digital asset.

Most enterprise software currently is licensed per user or in some cases organization-based licensing may be available. For example, a graphic designer at a large advertising agency using a licensed software to generate an expensive advertising campaign for a large company typically has to pay the same licensing fee for the software as a small business graphic designer who is making a sale poster for a small local store with a smaller budget. These licensing models have multiple shortcomings such as high initial cost, reduced user adoption, and the inability to determine and recover a fair share of the value their software adds to content creators.

In many cases, licensed software is used to generate digital assets. Digital assets are usually traded, offered for sale, sold, and stored on a distributed ledger, such as a blockchain. Embodiments of the present invention recognize the need for automatic royalty payments when a digital asset generated with licensed material or software is sold or traded. Embodiments of the present invention automatically initiate the smart contract with the royalty payments to one or more licensed parties.

Embodiments of the present invention recognize the need for an adaptable and affordable licensing method for users. Embodiments of the present invention will encourage widespread adoption, while allowing the licensing parties to more efficiently recoup research and development revenue and recover the bulk of licensing costs from the users that generate the most value from the licensed material. Embodiments of the present invention recognize users can easily misplace or forget license keys. Embodiments of the present invention advantageously link a license key to a user's cryptocurrency wallet, so the user does not need to keep track of printed license keys which were previously easily lost. Embodiments of the present invention recognize the need for usage of a license on one or more user devices. Embodiments of the present invention advantageously enable installation of the licensed asset (e.g., licensed software) on multiple systems (e.g., PC, laptop, tablet, etc.) without requiring separate license purchasing for each device. Embodiments of the present invention prevent software piracy and revenue losses to software manufacturers as the license is tied to the cryptocurrency wallet of the user eliminating unauthorized license sharing. In some embodiments, in order save content or enable the sale of content generated with the software, embodiments of the invention may require signing the transaction with the user's private cryptocurrency key. Embodiments of the present invention automatically collect or distribute payments of licensing fees to licensors when a user sells content generated with the licensed product. Embodiments of the present invention enable a user to try a software application without paying a subscription cost of an entire month or year.

Embodiments of the present invention advantageously leverage smart contracts running on a distributed ledger, such as blockchain, to provide flexible, verifiable, and secure license agreement between a licensor and the users. Embodiments of the present invention recognize the invention can also be used on other commerce space and is not limited to use on a blockchain. Embodiments of the present invention provide a dynamic and flexible adjusted licensing schema based on the cost benefits from selling the digital content on the digital market through NTF token or as a licensed art. Embodiments of the present invention provide continuous verification of the sell-purchase transactions of the digital content immutably linked to the original smart contract-based agreement between digital asset producer and licensor for monetization and verification purposes based on private keys. Embodiments of the present invention decreases pirated and unauthorized reproduction of a creator's content by reviewing originality before publishing new content.

Embodiments of the present invention recognize a digital asset can be sold multiple times. For example, user A purchases an NFT from the content creator and then user A resells the NFT to user B. Embodiments of the present invention recognize royalty payments can include royalties on every sale, including resale. In some instances, a digital asset includes a physical asset. For example, an NFT of a digital item, such as purse or car may also include the physical item of the physical purse or car. Meaning, when the digital version is of the NFT is purchased, the physical item is included or linked to the purchase as well.

Embodiments of the present invention receive and store cryptographical signatures and keys for licensing agreements which enables both parties to not have to separately keep track of licenses and the terms of the licenses. Embodiments of the present invention recognize a user may have to later re-install the licensed software or install it on another device. Embodiments of the present invention validate that the user has access to a particular cryptocurrency wallet in order for it to be able to retrieve and re-apply the license purchase off the blockchain.

Embodiments of the present invention generate timestamps when digital assets are created or saved to the blockchain. The generated timestamp can also serve as a timestamped copyright claim of the content belonging to the content creator and if anyone was to duplicate it. Further, the timestamp establishes the original source of the content by verifying the immutable timestamps within the blockchain. Embodiments of the present invention further validate digital assets by the private key associated with the cryptocurrency wallet the digital asset is associated with.

Embodiments of the present invention further allow the concept of splitting ownership of an asset. This would allow for partial ownership of the license or copyright within specific instances and situations, such as between a large company and individual employees of the company. Embodiments of the present invention split the ownership of an asset into multiple parts and the owning body must retain a controlling interest. Embodiments of the present invention allow for the ability to create owning "segments" of the license or copyright creation process without losing the controlling interest of the claim. This protects the buyer and sellers within the transactions, but the buyer of a partial interest (non-controlling) would be along for the ride so-to-speak and have a vested interest within the transaction(s). The percentage yield of the license type and transactions processing could be applied per the invention enclosed maintaining fees and percentages, etc.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram of a computing environment, generally designated 100, suitable for the execution of at least some of the computer code involved in performing the inventive methods, such as digital asset transaction code 150, in accordance with at least one embodiment of the present invention. In addition to digital asset transaction code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and digital asset transaction code 150, as identified above), peripheral device set 114 (including user interface (UI) device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
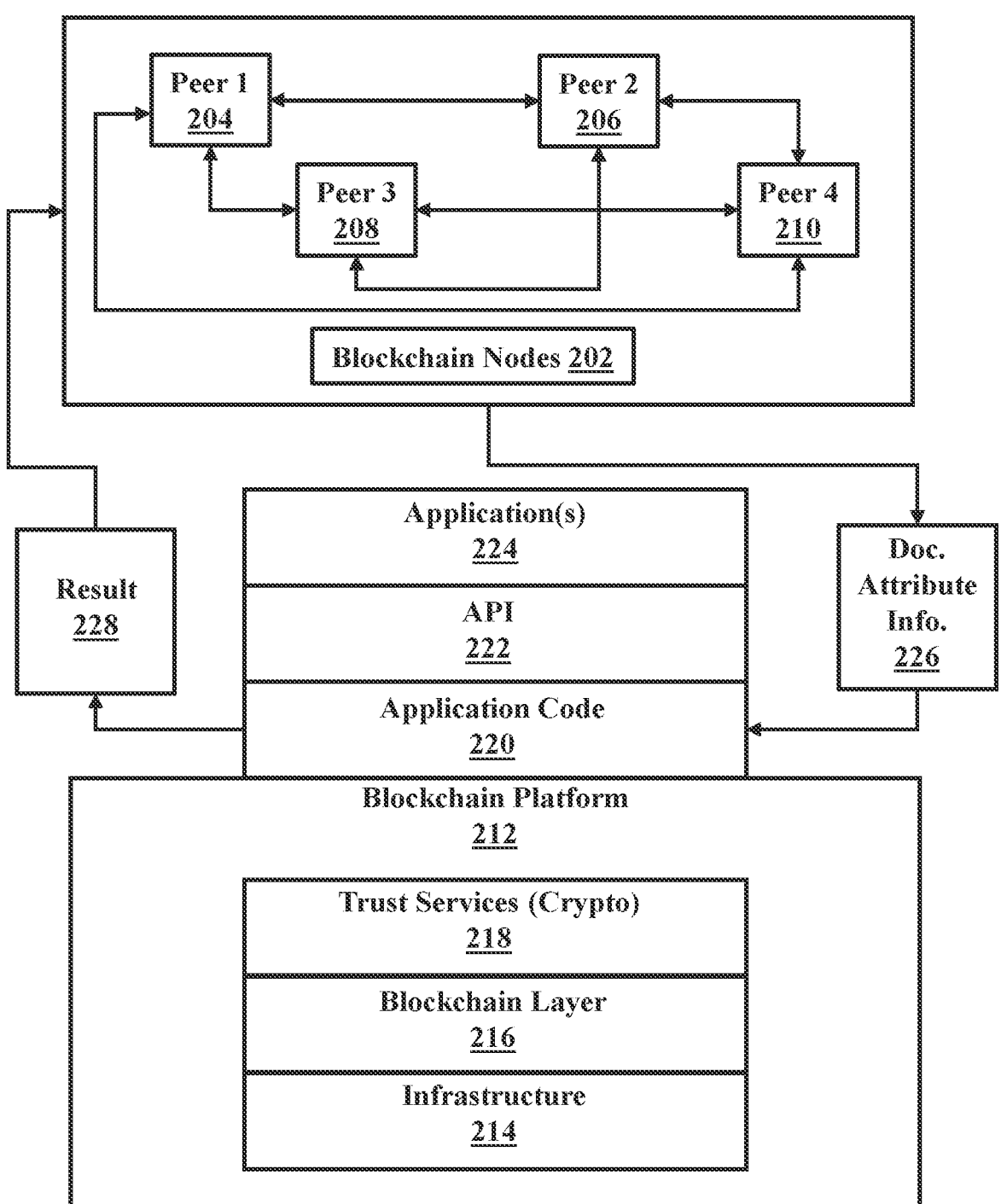
FIG. 2A illustrates an example blockchain architecture configuration, according to at least one embodiment of the present invention.

FIG. 2A illustrates an example blockchain architecture configuration, according to at least one embodiment of the present invention. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute the generation of storage spaces, the reserving of storage spaces, updates to current licenses or license agreements, etc. The smart contracts can themselves be used to identify rules associated with authorization and access requirements and usage of the ledger. For example, the document attribute(s) information 226 may be processed by one or more processing entities (e.g., virtual machines) included in the blockchain layer 216. The result 228 may include a plurality of linked shared documents (e.g., with each linked shared document recording the issuance of a smart contract, etc.). The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus establishing a new smart contract between a user and a licensor).

Figure 2B:
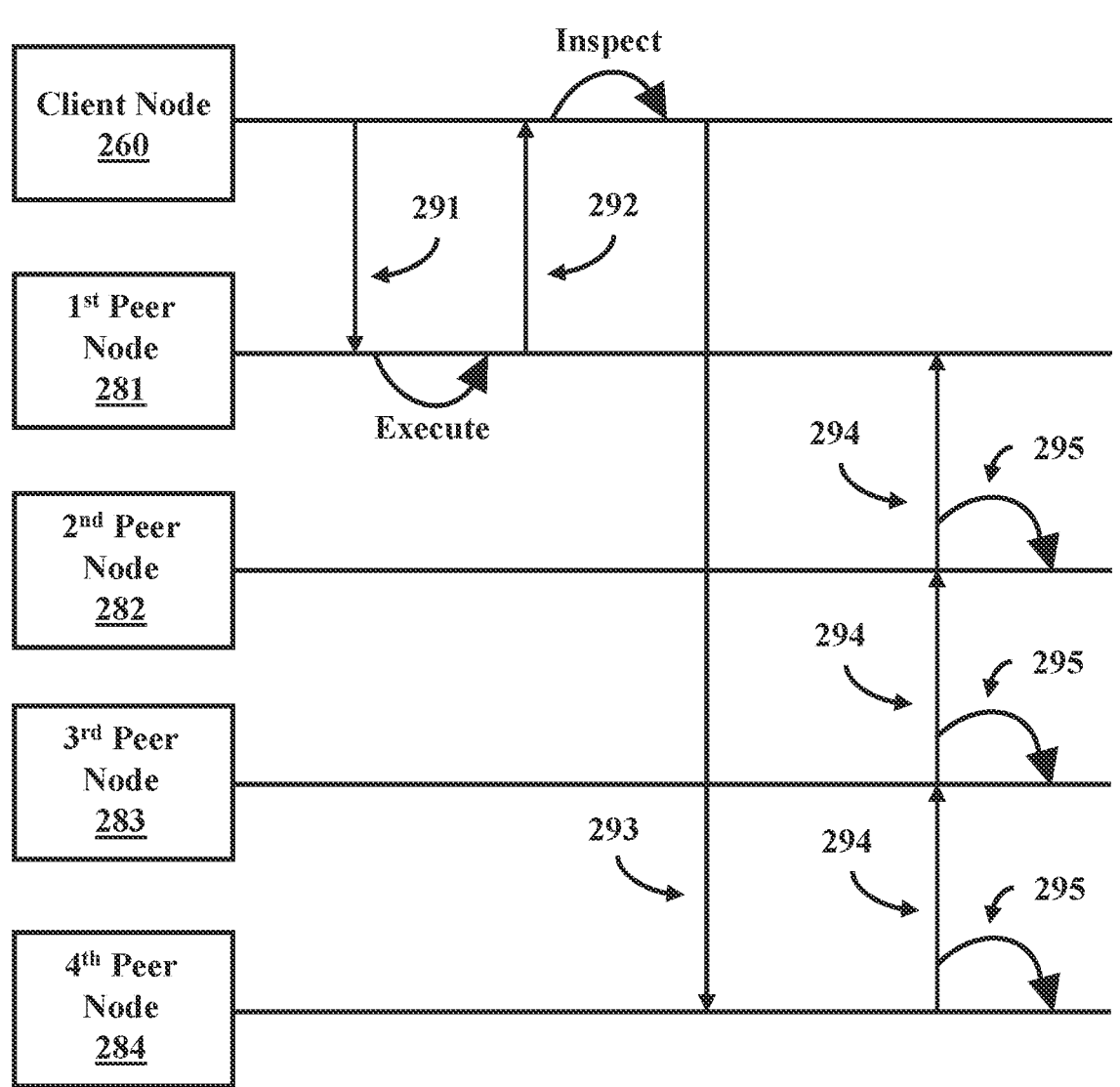
FIG. 2B illustrates a blockchain transactional flow, according to at least one embodiment of the present invention.

FIG. 2B illustrates an example of a blockchain transactional flow 250 between nodes of the blockchain according to at least one embodiment of the present invention. Referring to FIG. 2B, the transaction flow may include a transaction proposal 291 sent by an application client node 260 to an endorsing peer node 281 (e.g., in some embodiments, the transaction proposal 291 may be sent for determining licensing terms, ownership, or authentication of a digital asset). The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the license terms, ownership, or other digital asset data to ensure correct allotment and distribution of assets for transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (e.g., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (e.g., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
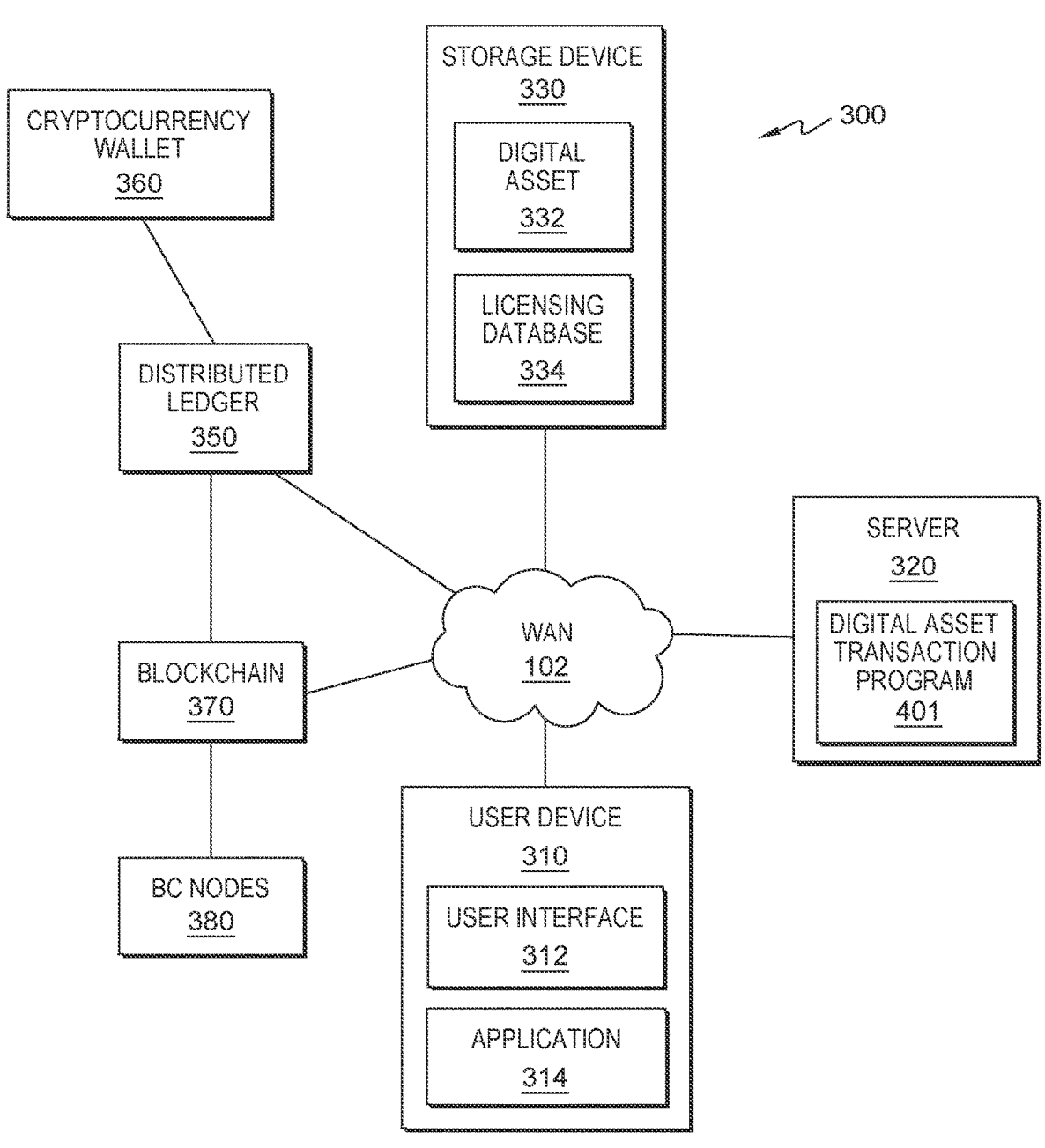
FIG. 3 is a functional block diagram of an exemplary licensing system, generally designated 300, suitable for operation of a digital asset transaction program 401, in accordance with at least one embodiment of the present invention.

FIG. 3 is a functional block diagram of an exemplary digital asset transaction system, generally designated 300, suitable for operation of a digital asset transaction program 401, in accordance with at least one embodiment of the present invention. Digital asset transaction system may be implemented in a computing environment, such as computing environment 100, as described with reference to FIG. 1. FIG. 3 provides an illustration of only one implementation and does not imply any limitations with regard to the environments in which different embodiments may be implemented. Many modifications to the depicted environment may be made by those skilled in the art without departing from the scope of the present invention as recited by the claims.

Digital asset transaction system 300 includes user device 310, server 320, storage device 330, distrusted ledger 350, cryptocurrency wallet 360, blockchain 370, and BC Nodes 380, interconnected over network, such as WAN 102. In general, user device 310 can represent any programmable electronic device or combination of programmable electronic devices capable of executing machine readable program instructions and communicating with server 320, storage device 330 and other devices (not depicted) via a network, such as WAN 102. In an embodiment, user device 310 is an end user device, such as EUD 103 depicted in FIG. 1, and can be a mobile device, laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art.

User device 310 further includes user interface 312 and application 314. User interface 312 is a program that provides an interface between a user of an end user device, such as user device 310, and a plurality of applications that reside on the device (e.g., application 314). A user interface, such as user interface 312, refers to the information (such as graphic, text, and sound) that a program presents to a user, and the control sequences the user employs to control the program. A variety of types of user interfaces exist. In one embodiment, user interface 312 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 312 is a script or application programming interface (API).

Application 314 can be representative of one or more applications (e.g., an application suite) that operate on user device 310. In an embodiment, application 314 is representative of one or more applications (e.g., asset holding applications, asset marketplace applications, and licensed applications) located on user device 310. For example, a user accesses a licensed software via application 314 to design a digital asset. In another example, a user uploads a digital asset online via application 314. In various example embodiments, application 314 can be an application that a user of user device 310 utilizes to access an asset marketplace website and post for sale, trade, offer, or buy assets. In an embodiment, application 314 can be a client-side application associated with a server-side application running on server 320 (e.g., a client-side application associated with digital asset transaction program 401). In an embodiment, application 314 can operate to perform processing steps of digital asset transaction program 401 (i.e., application 314 can be representative of digital asset transaction program 401 operating on user device 310).

Server 320 is configured to provide resources to various computing devices, such as user device 310. In general, server 320 represents any programmable electronic device or combination of programmable electronic devices capable of executing machine readable program instructions and communicating with each other, as well as with user device 310, storage device 330, and other computing devices (not shown) within a network, such as WAN 102. In an embodiment, server 320 is a standalone device, such as computer 101 depicted in FIG. 1, that is capable of running a program and accessing a network or querying a database. In an embodiment, server 320 can be a management server, a web server, an application server, a mobile device, or any other electronic device or computing system capable of receiving, sending, and processing data. In an embodiment, server 320 represents a server computing system utilizing multiple computers as a server system. In an embodiment, server 320 represents a computing system utilizing clustered computers and components (e.g., database server computer, application server computer, web server computer, webmail server computer, media server computer, etc.) that act as a single pool of seamless resources. Server 320 further includes digital asset transaction program 401. Digital asset transaction program 401 may be formed, at least in part, from digital asset transaction code 150 as depicted and described with reference to FIG. 1.

In various embodiments, storage device 330 is a secure data repository for persistently storing user and asset information utilized by various applications and user devices of a user, such as Application 314 and user device 310. In an embodiment, storage device 330 is representative of one or more databases, such as remote database 130 depicted in FIG. 1. In an embodiment, storage device 330 includes digital asset 332. Storage device 330 may be implemented using any volatile or non-volatile storage media known in the art for storing data. For example, storage device 330 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 330 may be implemented with any suitable storage architecture known in the art, such as a relational database, an object-oriented database, or one or more tables.

In an embodiment, digital asset 332 includes information associated with digital assets, as well as the digital assets themselves. Digital assets can include any digital asset owned by the user. In an embodiment, a digital asset is a digital asset the user created or is working on. In an embodiment, a digital asset is a digital asset purchased or traded on a digital marketplace platform. In an embodiment, digital assets are stored in a cryptocurrency wallet or any transactions involving digital assets recorded in distributed ledger 350.

In an embodiment, licensing database 334 includes information on one or more licenses, license agreements, royalties, and license keys. For example, if a piece of software is licensed to a user, digital asset transaction program 401 stores one or more license keys associated with the software license in licensing database 334. In an embodiment, digital asset transaction program 401 accesses licensing database 334 to determine licensing keys, licenses, license agreements, and royalties associated with particular digital assets. For example, digital asset transaction program 401 accesses licensing database 334 to determine the royalties for a digital asset are 10% of the sale, and that the royalties are to be given to the original artist of the digital asset.

In an embodiment, digital asset transaction program 401 may be configured to access various data sources, such as digital asset 332 and licensing database 334, that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, digital asset transaction program 401 enables the authorized and secure processing of personal data. In an embodiment, digital asset transaction program 401 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, digital asset transaction program 401 provides information regarding personal data and the nature (e.g., type, scope, purpose, duration, etc.) of the processing. In an embodiment, digital asset transaction program 401 provides a user with copies of stored personal data. In an embodiment, digital asset transaction program 401 allows for the correction or completion of incorrect or incomplete personal data. In an embodiment, digital asset transaction program 401 allows for the immediate deletion of personal data.

In an embodiment, distributed ledger 350 is a series or chain of blocks on which transaction details are recorded. In an embodiment, distributed ledger 350 consists of one or more nodes. In an embodiment, distributed ledger 350 is a digitally distrusted, decentralized, public ledger, such as a blockchain, that exists across a network. In an embodiment, distributed ledger 350 includes blockchain 370.

In an embodiment, cryptocurrency wallet 360 includes information associated with one or more public and private keys. In an embodiment, cryptocurrency wallet 360 includes information on one or more digital assets. In an embodiment, a digital asset includes an NFT, cryptocurrency, funds, or other digital assets. In an embodiment, cryptocurrency wallet 360 is a hardware cryptocurrency wallet.

In an embodiment, blockchain 370 may be configured to use one or more smart contracts that manage transactions for multiple participating nodes. In some embodiments, a neural network and/or any form of machine-learning may be utilized by the cloud service providers to analyze the smart contracts and/or transaction requests to determine license terms or authenticating information. In an embodiment, blockchain 370 may store data to be shared among the nodes, such as blockchain (BC) nodes 380. In an embodiment, blockchain 370 may be represented by blockchain architecture configuration 200, as described with reference to FIG. 2A.

In an embodiment, BC nodes 380 includes one or more nodes. In an embodiment, BC nodes 380 may be represented by blockchain nodes 202, as previously described with reference to FIG. 2A.

In an embodiment, digital asset transaction program 401 identifies a license associated with a digital asset between a licensee and a licensor. In an embodiment, digital asset transaction program 401 receives user input regarding a license associated with a digital asset. For example, a licensee or licensor may upload a license agreement or license information via user device 310 to digital asset transaction program 401. In an embodiment, digital asset transaction program 401 determines the terms and conditions of the license agreement. In an embodiment, the terms and conditions of the license include, for example, royalty amounts, royalty percentages, and royalty timelines. In an embodiment, digital asset transaction program 401 determines the terms and conditions of the license agreement by performing natural language processing on the license agreement or user input. For example, digital asset transaction program 401 determines the terms of the license are the licensor receives a 20% royalty for the first sale of any digital asset created with the licensed material, such as digital software. In another example, digital asset transaction program 401 determines the terms of the license are the licensor receives a royalty for the first five years after the digital asset generated with the licensed material is posted for sale.

In an embodiment, digital asset transaction program 401 determines a signed transaction is initiated from the cryptocurrency wallet of the licensee to the cryptocurrency wallet of the licensor indicating the licensee's acceptance of the licensor's terms for the license.

In an embodiment, digital asset transaction program 401 determines one or more tiers of the license terms. For example, digital asset transaction program 401 determines one or more royalty pricing tiers. In an embodiment, the royalty pricing tiers are based on the number of products produced with the licensed material or the size of the licensee or licensor party. In an embodiment, a user or licensee selects one or more royalty pricing tiers. For example, digital asset transaction program 401 determines one or more royalty pricing tiers in a license to include "(i) 0% initial cost, and 20% commission of any content sale to licensor, (ii) $99 initial cost, and 5% commission of any content sale to licensor, (iii) $199 initial cost and 3% commission of any content sale to licensor, or (iv) $999 initial cost and no commission. Here, user or licensee is a small project developer working on a small budget for a digital asset and selects royalty pricing tier (i) to save money on the initial cost. In an embodiment, digital asset transaction program 401 stores information on the one or more selected royalty pricing in licensing database 334, cryptocurrency wallet 360, distributed ledger 350, or blockchain 370.

In an embodiment, digital asset transaction program 401 generates one or more licensing tiers based on a learning algorithm that learns the license tiering preferences of a licensor over time. In an embodiment, digital asset transaction program 401 uses a learning algorithm that learns the license tiering preferences of a licensor or licensee over time. The learning algorithm may also analyze a frequency that the one or more license tiers are used by other entities. If digital asset transaction program 401 is successful and often used the learning algorithm, the learning algorithm may generate stricter usage conditions that allow for less modification by other entities borrowing the digital asset transaction program 401. Other factors can contribute to the automatic generation of the usage conditions, such as the licensed material, project licensed material is used for, digital asset collection, or number of employees. In an example, the learning algorithm may determine that an entity with under 10 employees more frequently selects a licensing tier with a lower up-front cost but higher percentage of royalties.

In an embodiment, digital asset transaction program 401 determines a licensed material was used to create a digital asset. For example, digital asset transaction program 401 determines the digital asset was generated using a licensed software. In an embodiment, digital asset transaction program 401 receives user input or information to determine a licensed material was used to create a digital asset. In an embodiment, digital asset transaction program 401 accesses the metadate of a file of a digital asset to determine the licensed software was used to generate the digital asset. In an embodiment, digital asset transaction program 401 stores the digital asset and the determined licensed material in at least one of a cryptocurrency wallet 360 or distributed ledger 350.

In an embodiment, digital asset transaction program 401 determines and validates the digital asset was generated with the licensed material. In an embodiment, digital asset transaction program 401 determines the user has access to the cryptocurrency wallet the software was licensed to. In an embodiment, digital asset transaction program 401 determines a licensed material was used to create a digital asset by determining the licensee had access to the cryptocurrency wallet the licensed material was licensed to. For example, if digital asset transaction program 401 determines cryptocurrency wallet W storing digital asset A was licensed using software S, digital asset transaction program 401 further determines digital asset A was generated using licensed software S.

In an embodiment, digital asset transaction program 401 validates a digital asset based on a timestamp of a digital asset. In an embodiment, digital asset transaction program 401 generates a timestamp when the digital asset is saved to the blockchain. In an embodiment, digital asset transaction program 401 hashes the timestamp. In an embodiment, digital asset transaction program 401 validates a matching hash with a timestamp. In an embodiment, digital asset transaction program 401 hashes the digital asset file. In an embodiment, digital asset transaction program 401 determines valid ownership based on the earliest timestamp from a particular hash. For example, if digital asset transaction program 401 determines two identical hashes for two different digital assets, digital asset transaction program 401 determines the digital asset and hash with the earlier timestamp are authentic and validates ownership. In an embodiment, digital asset transaction program 401 stores the timestamp or hash of the timestamp locally, such as in digital assets 332. In an embodiment, digital asset transaction program 401 stores the timestamp or hash of the timestamp of the digital asset on the blockchain. In an embodiment, digital asset transaction program 401 accesses the generated timestamp of the digital asset to validate ownership of the digital asset. For example, user A could prove that user A had file A containing specific content at timestamp 2022-09-21_19:55:21. In this example, if user B wanted to claim ownership for file B with the same contents as file A but their timestamp would be a minute later, digital asset transaction program 401 would decline proof of ownership because it already contains an identical file with an earlier timestamp where that party has already proved ownership.

However, in some embodiments, digital asset transaction program 401 is unable to access the entirety of the contents of a file. In these embodiments, digital asset transaction program 401 stores the file hash in the blockchain instead of the entire file. For example, this allows user A at a later time to ascertain ownership of their content to themselves and at the time of the timestamp but without having to divulge the content to other parties at that point in time. In an embodiment, digital asset transaction program 401 denies validation of ownership if digital asset transaction program 401 determines another file has the same hash. In the previous example, if at a later time user B tries to claim ownership to same content that user A already did, when digital asset transaction program 401 hashes user B file, it will have the same hash user A already claimed and will not allow user B to generate an ownership claim. Therefore, user A will continue to be able to show first ownership claim of that content based on the file hash timestamp.

In an embodiment, digital asset transaction program 401 generates a smart contract. In an embodiment, digital asset transaction program 401 generates a smart contract for the digital asset created with the license. In an embodiment, the smart contract includes one or more terms of the license agreement. For example, if the license agreement terms are "5% of all sales royalties of digital assets generated with licensed material to software company A", digital asset transaction program 401 generates a smart contract including the term 5% of all sales royalties of digital assets generated with licensed material to software company A." In an embodiment, digital asset transaction program 401 stores a smart contract in licensing database 334, cryptocurrency wallet 360, distributed ledger 350, or blockchain 370.

In an embodiment, digital asset transaction program 401 receives cryptographical signatures of the license agreement or smart contract. In an embodiment, digital asset transaction program 401 stores the received cryptographical signatures of the license agreement or smart contract in licensing database 334, cryptocurrency wallet 360, distributed ledger 350, or blockchain 370.

In an embodiment, digital asset transaction program 401 identifies a transaction request for a digital asset. In an embodiment, a transaction request is a request to trade, sell, or offer for sale a digital asset. For example, a user posts a digital asset the user owns up for sale on a digital asset trading platform and digital asset transaction program 401 determines a transaction request. In another example, user receives an offer to sell a digital asset to another user and digital asset transaction program 401 determines a transaction request.

In an embodiment, digital asset transaction program 401 validates the origin of the digital asset. For example, digital asset transaction program 401 validates that a digital asset was created by the same creator and the same cryptocurrency wallet linked to the license. In an embodiment, digital asset transaction program 401 validates the origin of a digital asset based, at least in part, on file metadata or a cryptocurrency wallet key associated with the digital asset. For example, if digital asset transaction program 401 receives a transaction request for user A with cryptocurrency wallet A to sell a NFT to user B with cryptocurrency wallet B, digital asset transaction program 401 validates the origin of NFT based on a cryptocurrency wallet private key associated with cryptocurrency wallet A and the NFT.

In an embodiment, digital asset transaction program 401 executes a transaction request for a digital asset. In an embodiment, digital asset transaction program 401 executes a transaction request for a digital asset by transferring the digital asset ownership from one person to another. In an embodiment, digital asset transaction program 401 executes a transaction request for a digital asset by transferring the digital asset from one cryptocurrency wallet to another cryptocurrency wallet.

In an embodiment, in response to executing a transaction request for a digital asset, digital asset transaction program 401 executes the smart contract for the digital asset. For example, if the smart contract associated with digital asset states 5% of the sale goes to the digital artist and another 5% of the sale goes to the software licensor, digital asset transaction program 401 distributes 5% of the sale to the digital artist and another 5% of the sale to the software licensor.

In an embodiment, in response to executing a smart contract, digital asset transaction program 401 distributes the remaining funds from the transaction request. For example, digital asset transaction program 401 receives a transaction request to transfer NFT from cryptocurrency wallet A to cryptocurrency wallet B for $100. In this example, licensing program 101 receives $100 from cryptocurrency wallet B. Here, if the smart contract associated with the NFT states $5 of every sale of the NFT goes to the digital artist and another $5 every sale of the NFT goes to the software licensor, digital asset transaction program 401 distributes $5 of the sale to the digital artist, another $5 of the sale to the software licensor, and distributes the remaining $90 to cryptocurrency wallet A. Further, digital asset transaction program 401 transfers the NFT from cryptocurrency wallet A to cryptocurrency wallet B.

In an embodiment, digital asset transaction program 401 stores the digital asset transaction in distributed ledger 350. For example, if digital asset transaction program 401 transfers digital asset A from cryptocurrency wallet B to cryptocurrency wallet C, digital asset transaction program 401 records this transaction information that cryptocurrency wallet C now owns digital asset A in distributed ledger 350.

In an embodiment, digital asset transaction program 401 receives a request for license segmentation. In an embodiment, license segmentation includes splitting the ownership of a digital asset to more than one party. For example, ownership of a digital asset is split into 7 parts and the controlling party must also retain at least 4 parts and one or more other parties own the remaining 3 parts. In these embodiments, digital asset transaction program 401 generates a smart contract including information of the license segmentation. In an embodiment, digital asset transaction program 401 validates the distribution allocation designated in the smart contract. Meaning, digital asset transaction program 401 ensures the distribution of assets is done according to each owner or parties share or ownership based on the smart contract. In an embodiment, digital asset transaction program 401 ensures the compliance of a smart contract. Meaning, every party to the smart contract is allocated their share based on the terms of the smart contract. For example, if a smart contract terms are owner A owns 15% of a digital asset and owner B owns 85% of a digital asset, and the digital asset is sold for a monetary amount, digital asset transaction program 401 ensures owner A only receives 15% of the total monetary amount and owner B only receives 85% of the total monetary amount.

Figure 4:
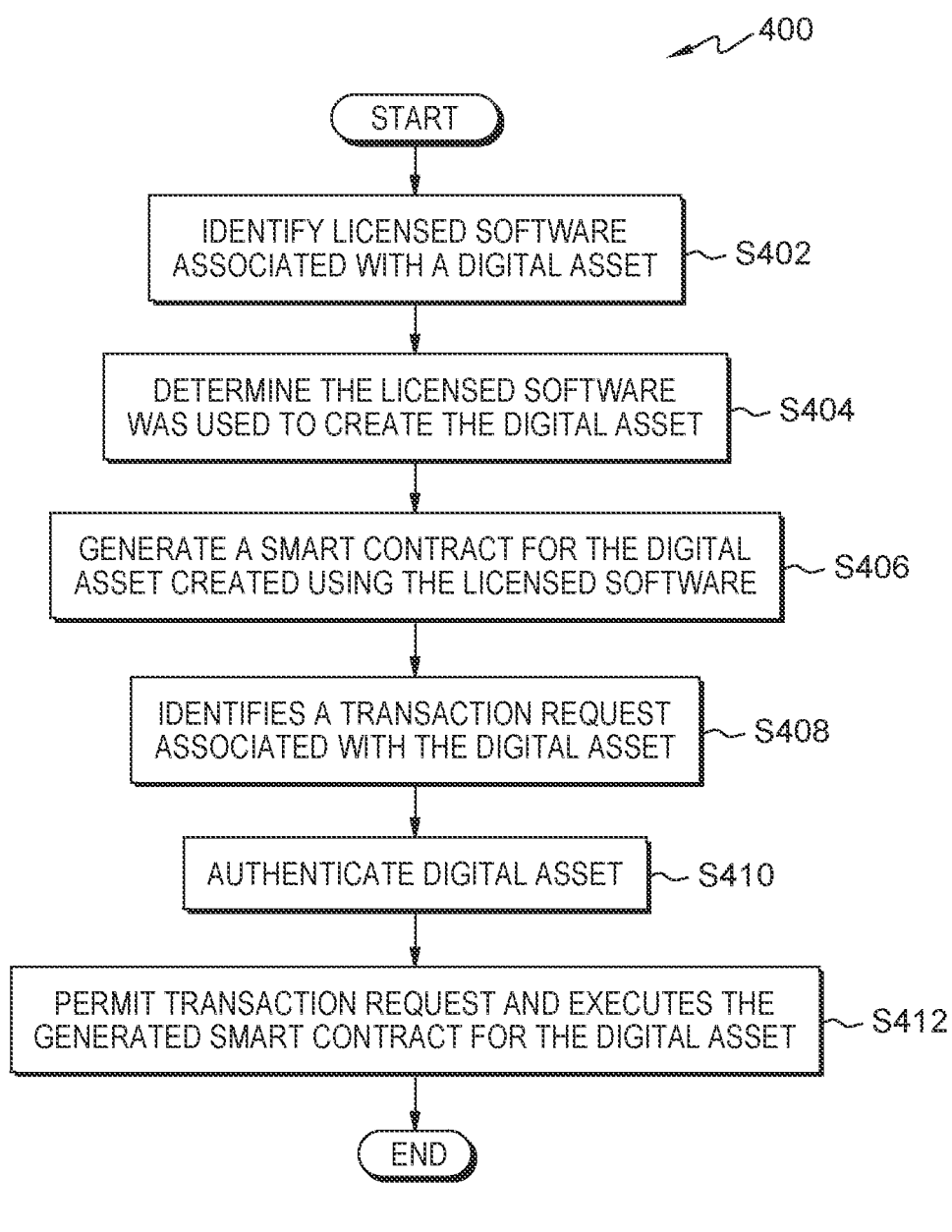
FIG. 4 is a flow chart diagram depicting operational steps for digital asset transaction program 401, generally designated 400, in accordance with at least one embodiment of the present invention.

FIG. 4 is a flow chart diagram depicting operational steps for digital asset transaction program 401, generally designated 400, in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

At step S402, digital asset transaction program 401 identifies licensed software associated with a digital asset. In an embodiment, digital asset transaction program 401 further determines the terms and/or conditions of the licensed software.

At step S404, digital asset transaction program 401 determines the licensed software was used to create the digital asset. In an embodiment, digital asset transaction program 401 determines the licensed software is stored in the same cryptocurrency wallet as the digital asset. In an embodiment, digital asset transaction program 401 accesses file metadata of the digital asset to determine that the licensed software was used to generate the digital asset.

At step S406, digital asset transaction program 401 generates a smart contract for the digital asset created using the licensed software. In an embodiment, digital asset transaction program 401 generates a smart contract based, at least in part, on the terms and/or conditions of a license agreement associated with the licensed software.

At step S408, digital asset transaction program 401 identifies a transaction request associated with the digital asset.

At step S410, in response to identifying the transaction request associated with the digital asset, digital asset transaction program 401 authenticates the digital asset. In an embodiment, digital asset transaction program 401 authenticates the digital asset based on a comparing file metadata or private keys corresponding to the digital asset.

At step S412, in response to authenticating the digital asset, digital asset transaction program 401 permits the transaction request and executes the generated smart contract for the digital asset. In an embodiment, digital asset transaction program 401 collects and distributes royalties based, at least in part, on the smart contract.

Figure 5:
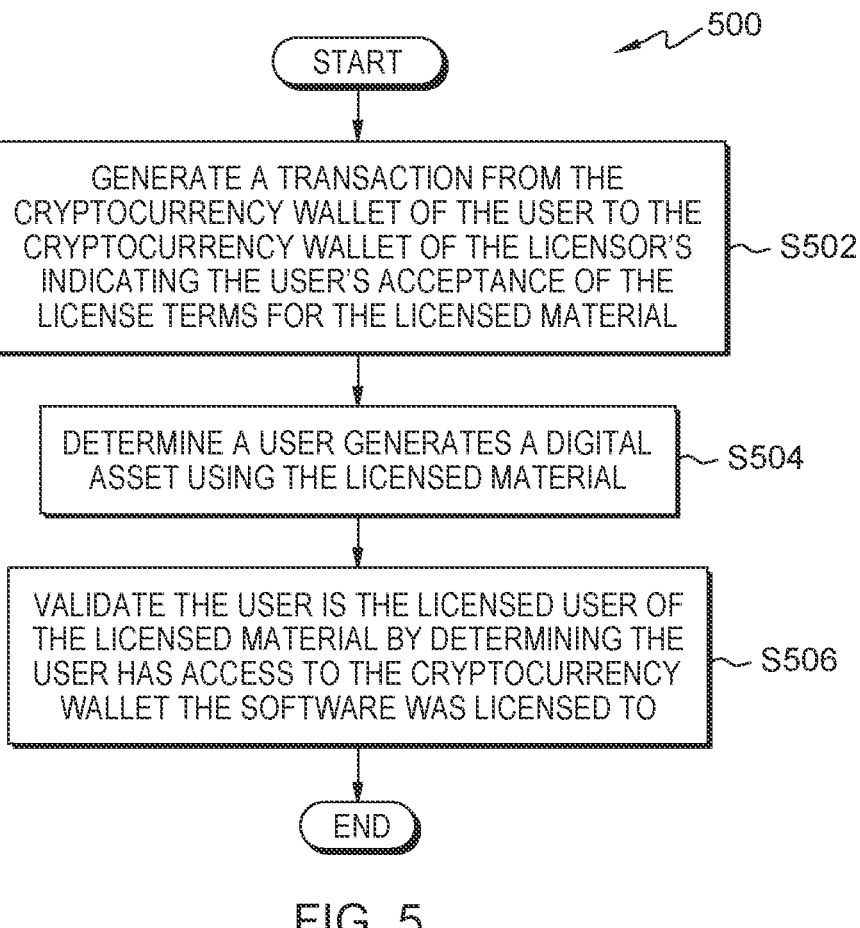
FIG. 5 is a flow chart diagram depicting operational steps for digital asset transaction program 401, generally designated 500, in accordance with at least one embodiment of the present invention.

FIG. 5 is a flow chart diagram depicting operational steps for digital asset transaction program 401, generally designated 500, in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

At step S502, digital asset transaction program 401 generates a transaction from the cryptocurrency wallet of the user to the cryptocurrency wallet of the licensor's indicating the user's acceptance of the license terms for the licensed material. In an embodiment, digital asset transaction program 401 stores information on the transaction in distributed ledger 350.

At step S504, digital asset transaction program 401 determines a user generates a digital asset using the licensed material. In an embodiment, digital asset transaction program 401 stores the digital asset in distributed ledger 350. In an embodiment, digital asset transaction program 401 generates a timestamp of the original source of the digital asset and stores the timestamp in distributed ledger 350.

At step S506, digital asset transaction program 401 validates the user is the licensed user of the licensed material by determining the user has access to the cryptocurrency wallet the software was licensed to.

Figure 6A:
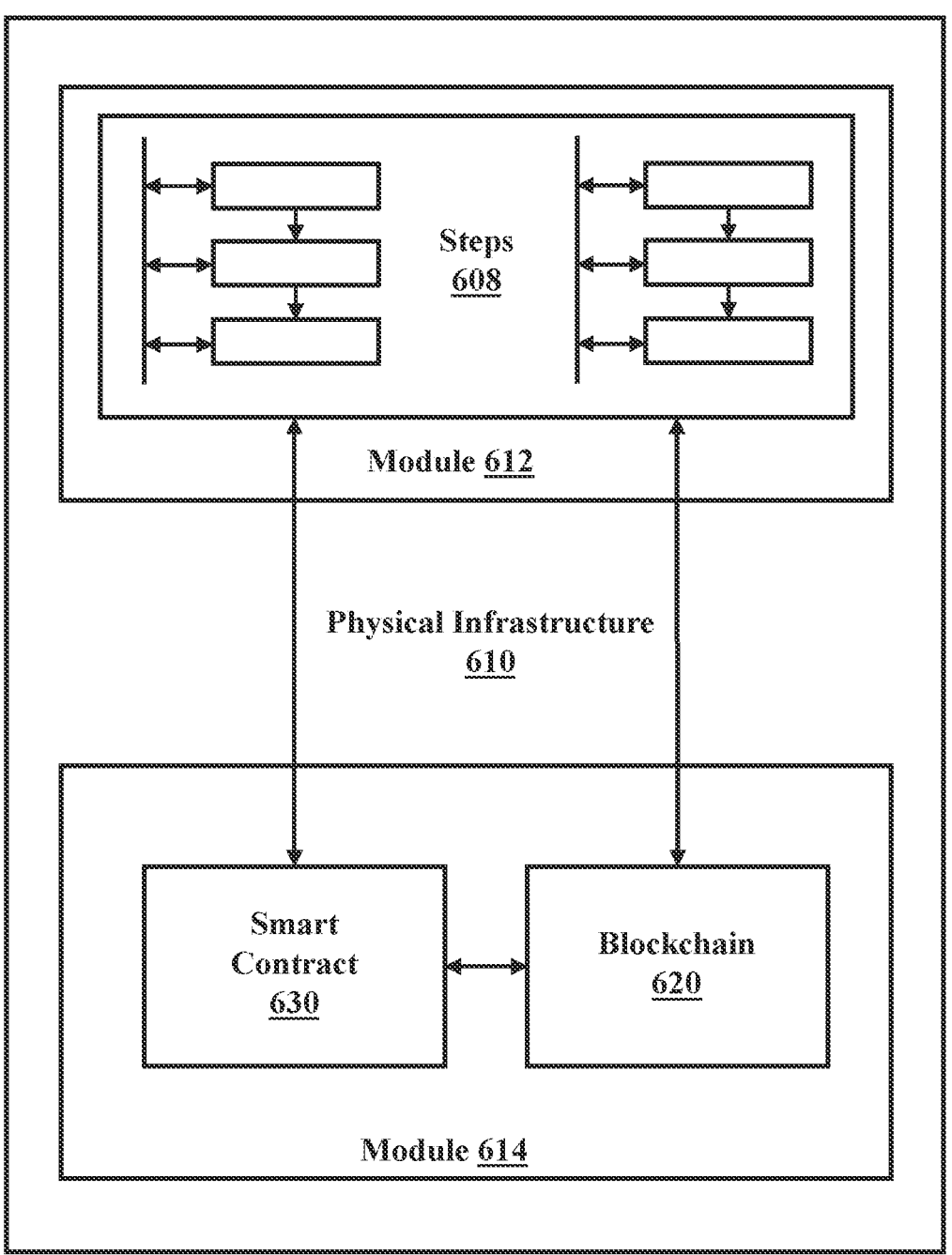
FIG. 6A illustrates an example system configured to perform one or more operations described herein, in accordance with at least one embodiment of the present disclosure.

FIG. 6A illustrates an example system 600 that includes a physical infrastructure 610 configured to perform various operations in accordance with embodiments of the present disclosure. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
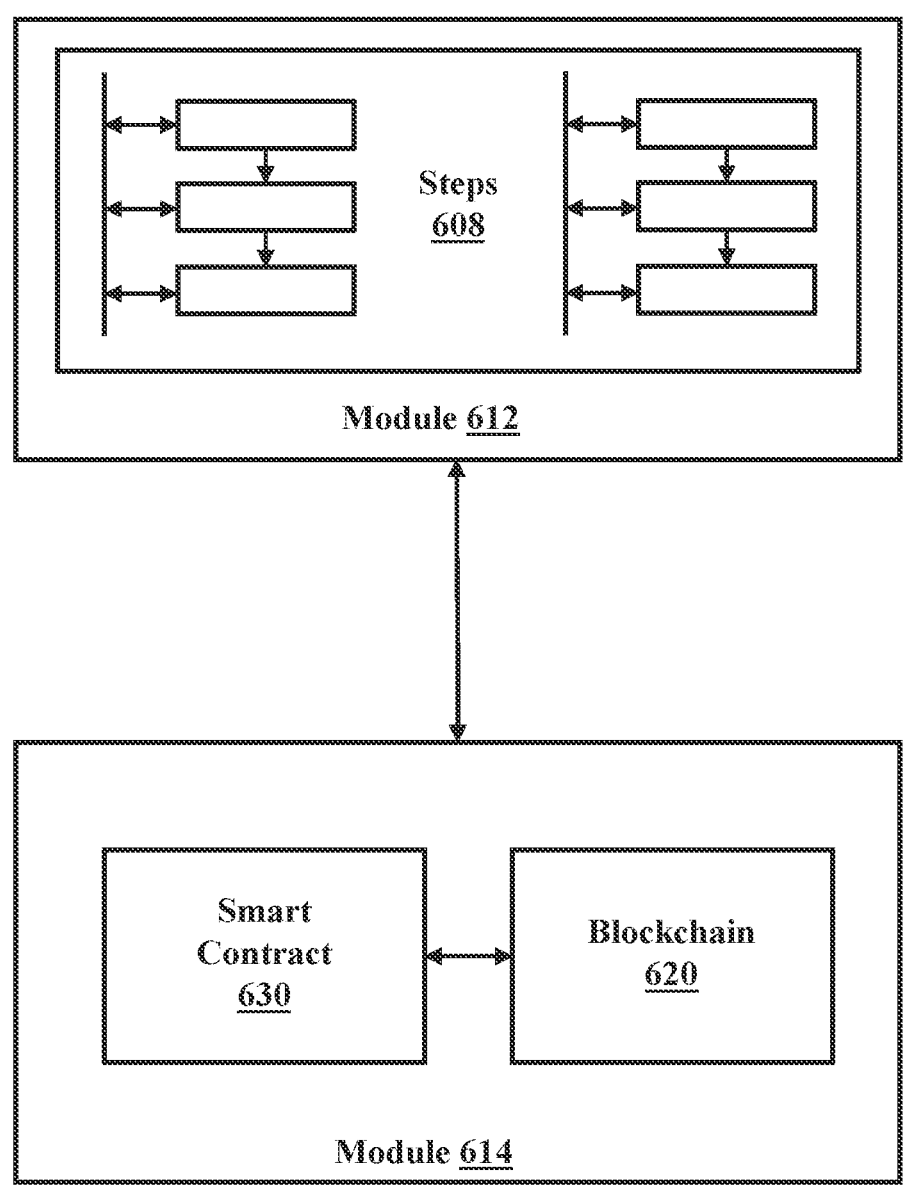
FIG. 6B illustrates another example system configured to perform one or more operations described herein, in accordance with at least one embodiment of the present disclosure.

FIG. 6B illustrates another example system 640 configured to perform various operations in accordance with embodiments of the present disclosure. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical module 612 and the module 614 may include one or more computers, servers, processors, memories, and/or wireless communication devices. Further, the module 612 and the module 614 may be a same module.

Figure 6C:
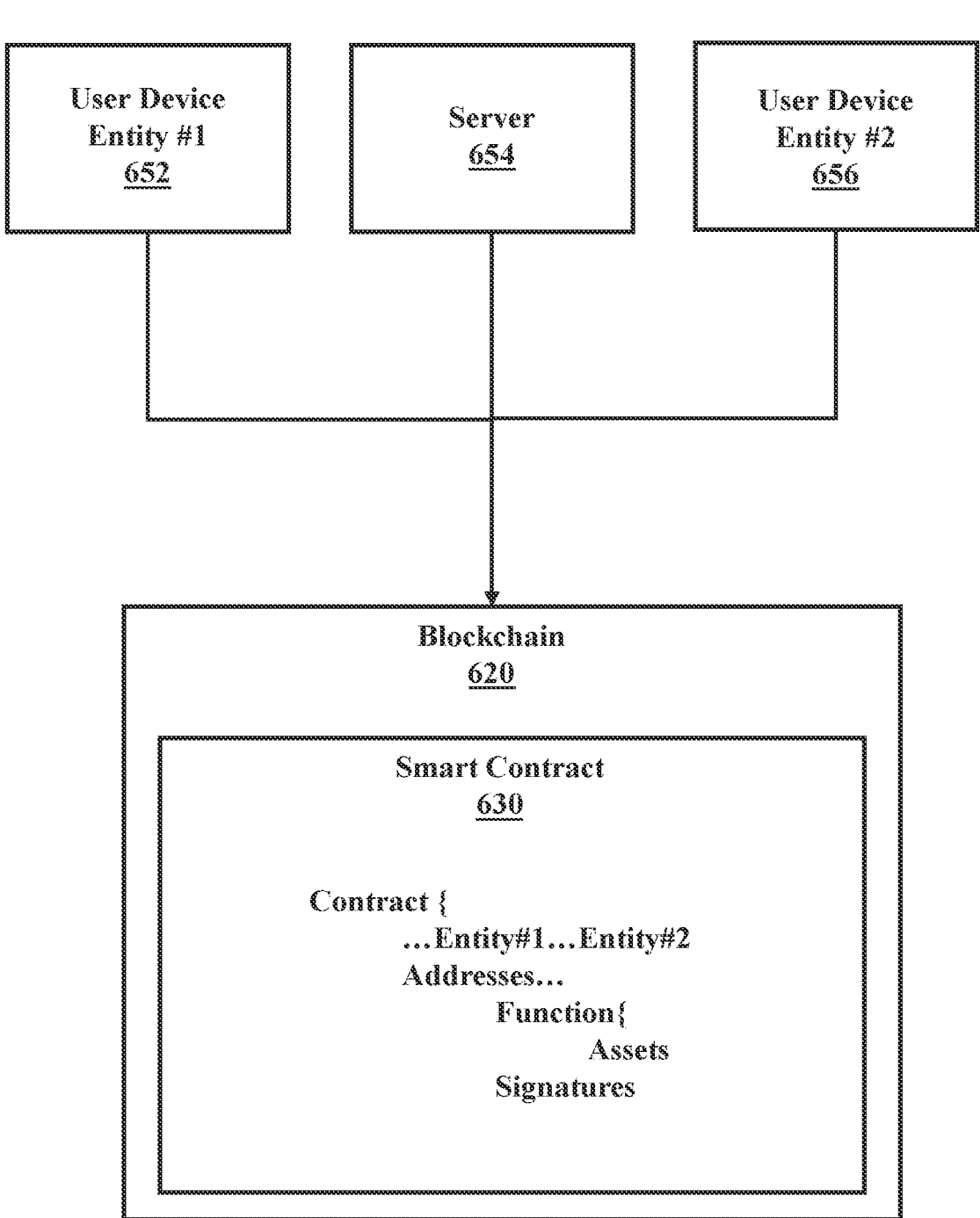
FIG. 6C illustrates a further example system configured to utilize a smart contract, in accordance with at least one embodiment of the present disclosure.

FIG. 6C illustrates an example system configured to utilize a smart contract configuration among contracting parties and a mediating server configured to enforce the smart contract terms on the blockchain in accordance with embodiments of the present disclosure. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
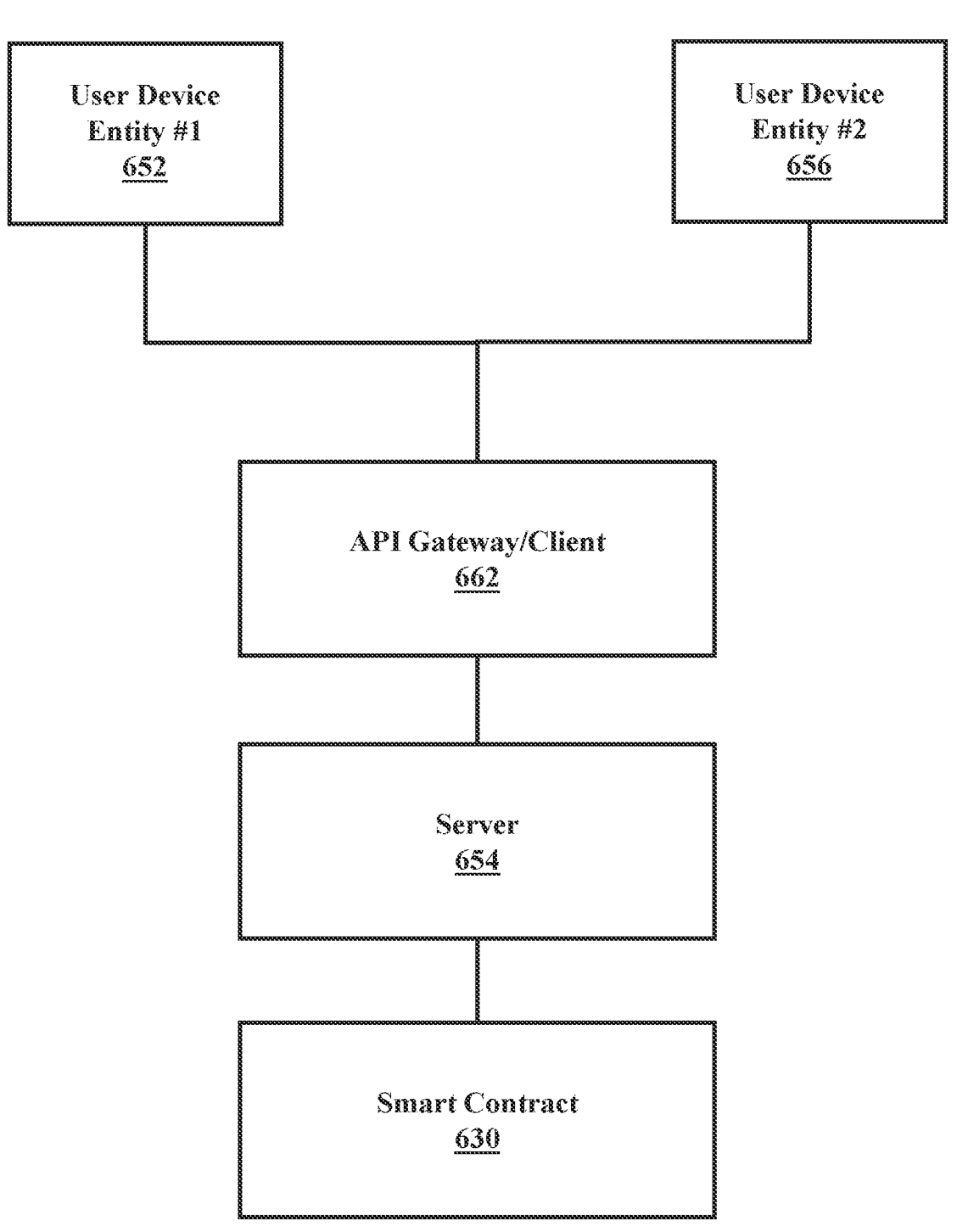
FIG. 6D illustrates yet another example system configured to utilize a blockchain, in accordance with at least one embodiment of the present disclosure.

FIG. 6D illustrates a system 660 including a blockchain, in accordance with embodiments of the present disclosure. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (e.g., invoke, queries, etc.) on the blockchain by connecting one or more entities 652 and 656 to a blockchain peer (e.g., server 654). Here, the server 654 is a blockchain network peer component that holds a copy of the world state and a distributed ledger allowing clients 652 and 656 to query data on the world state as well as submit transactions into the blockchain network where, depending on the smart contract 630 and license terms, authorized transactions will run the smart contract 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
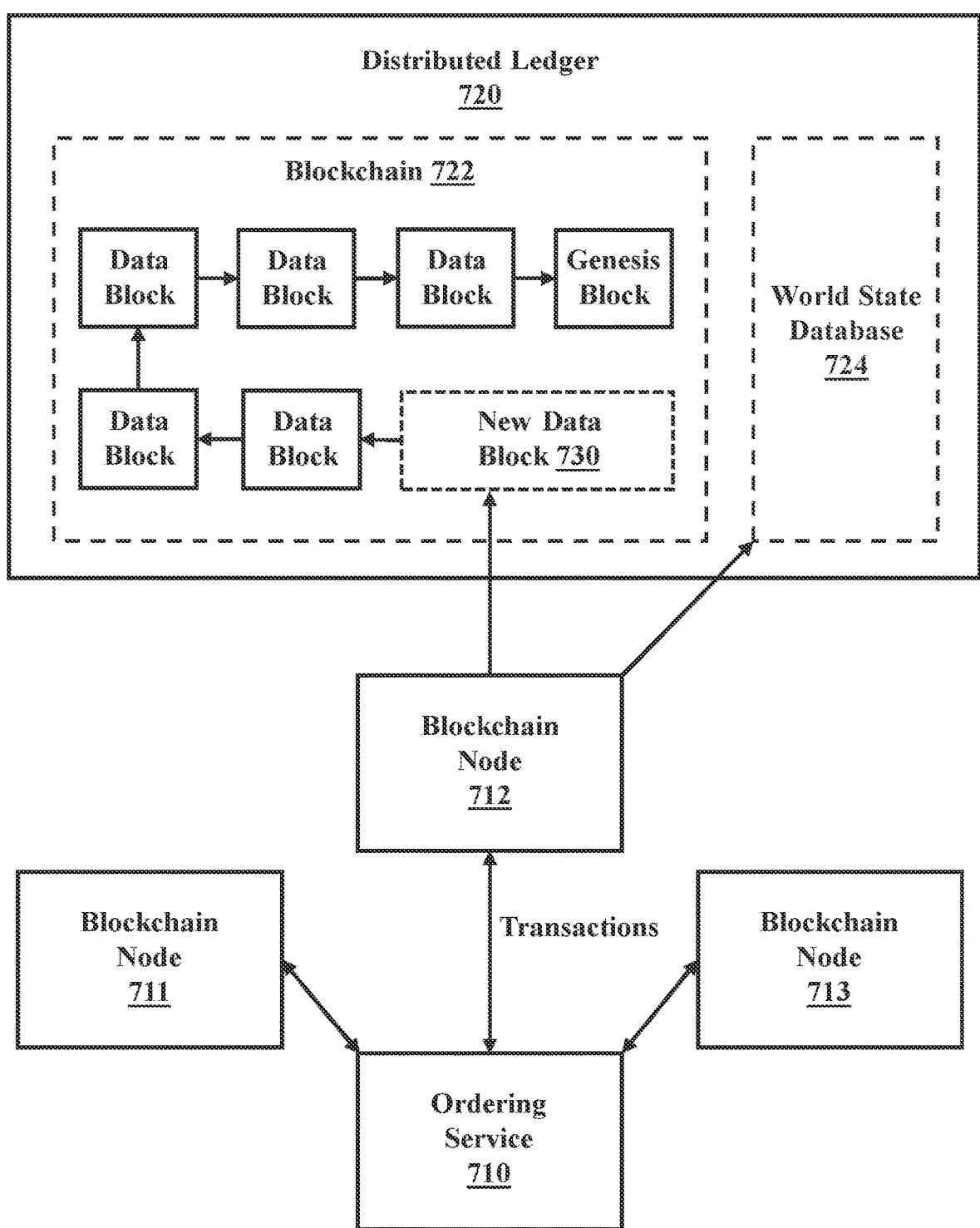
FIG. 7A illustrates a process for a new block being added to a distributed ledger, in accordance with at least one embodiment of the present disclosure.

FIG. 7A illustrates a process 700 of a new block being added to a distributed ledger 720, in accordance with embodiments of the present disclosure (e.g., when a new smart contract is generated, etc.), and FIG. 7B illustrates contents of a new data block structure 730 for blockchain, in accordance with embodiments of the present disclosure. The new data block 730 may contain document linking data.

Referring to FIG. 7A, clients (not shown) may submit transactions to blockchain nodes 711, 712, and/or 713. Clients may be instructions received from any source to enact activity on the blockchain 722. As an example, clients may be applications that act on behalf of a requester, such as a device, person or entity to propose transactions for the blockchain. The plurality of blockchain peers (e.g., blockchain nodes 711, 712, and/or 713) may maintain a state of the blockchain network and a copy of the distributed ledger 720. Different types of blockchain nodes/peers may be present in the blockchain network including nodes which simulate and authorize transactions proposed by clients; recommending nodes which utilize natural language processing techniques and recommend entities to be automatically contracted with users; and committing peers which validate transactions and commit transactions to the distributed ledger 720. In this example, the blockchain nodes 711, 712, and/or 713 may perform the role of endorser node, committer node, recommender node, or all three.

The distributed ledger 720 includes a blockchain 722 which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Nodes receive transactions from clients and authorize the transaction based on simulated results. Nodes hold smart contracts which simulate the transaction proposals. When a node authorizes a transaction, the node creates a transaction endorsement which is a signed response from the node to the client application indicating the authorization transaction. The method of authorizing a transaction depends on one or more licensing terms, licenses, or licensing tiers which may be specified within chaincode. An example of a licensing terms is "5% of a transaction goes to the licensor". Different channels may have different licensing terms. Authorized transactions are forward by the client application to ordering service 710.

The ordering service 710 accepts authorized transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the authorized transactions and specifies the order in which those transactions are committed to the distributed ledger 720. The architecture of the blockchain network may be designed such that the specific implementation of 'ordering' becomes a pluggable component.

Transactions are written to the distributed ledger 720 in a consistent order. The order of transactions is established to ensure that the updates to the state database 724 are valid when they are committed to the network. Unlike a cryptocurrency blockchain system where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). When the transaction is authorized, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the data block 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The data block 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, signature of licensor, identities of licensors, a proposal hash, chaincode events, response status, namespace, a read set (list of key and version read by the transaction, etc.), a write set (list of key and value, etc.), a start key, an end key, a list of keys, a Merkle tree query summary, and the like. The transaction data may be stored for each of the N transactions.

In some embodiments, the data block 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the data block 750 but could also be located in the block header 740 or the block metadata 760. The new data 762 may include a document composite key that is used for linking the documents within an organization.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the ordered metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the data block 750 and a validation code identifying whether a transaction was valid/invalid.

Figure 7C:
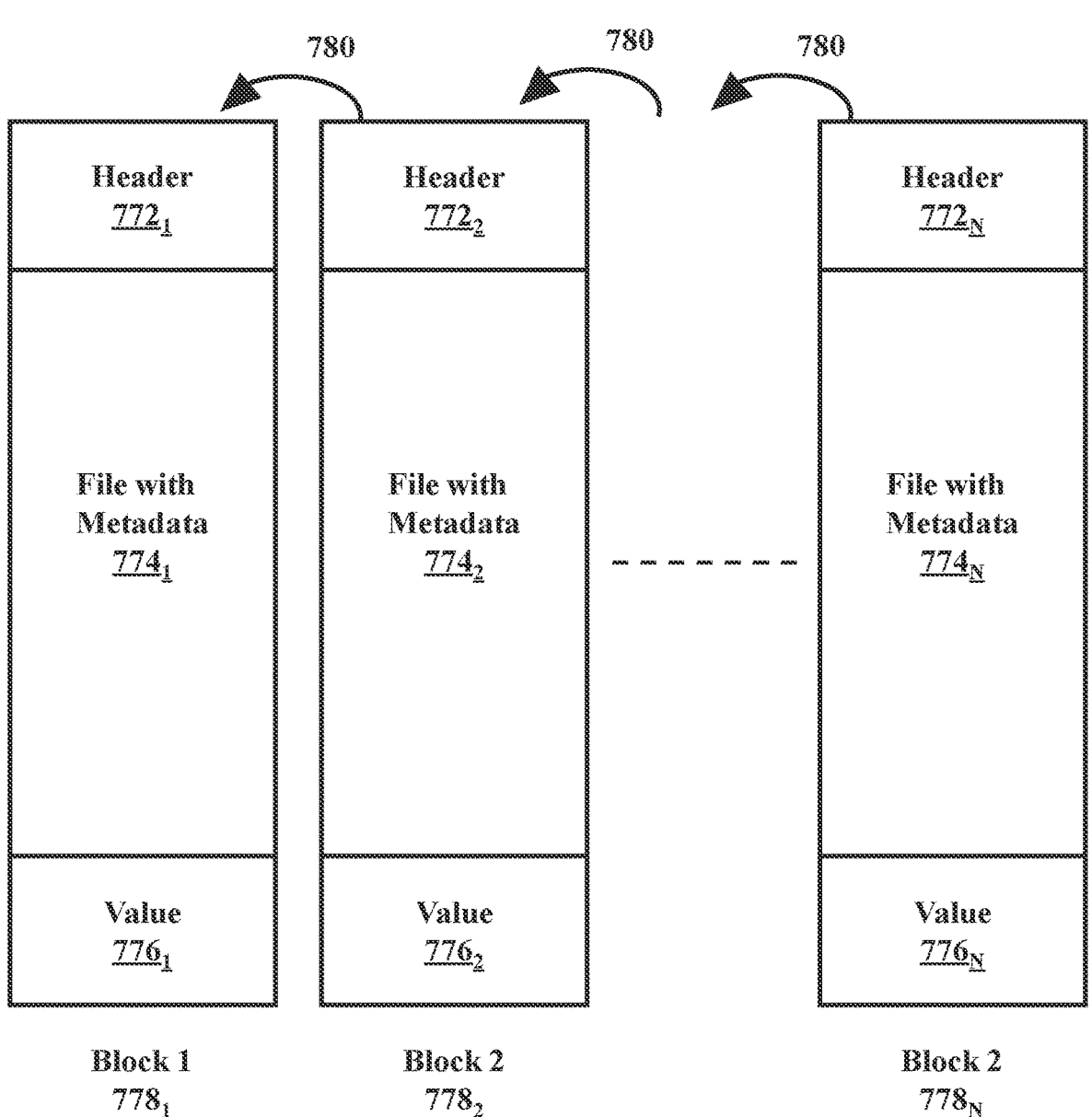
FIG. 7C illustrates a blockchain for digital content, in accordance with at least one embodiment of the present disclosure.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | . . . | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks 778$_1$, 778$_2$, . . . 778$_N$ cryptographically linked in an ordered sequence, where N≥1. The encryption used to link the blocks 778$_1$, 778$_2$, . . . 778$_N$ may be any of a number of keyed or un-keyed Hash functions. In one embodiment, the blocks 778$_1$, 778$_2$, . . . 778$_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks 778$_1$, 778$_2$, . . . , 778$_N$ may be cryptographically linked by a function that is different from a hash function. For purposes of illustration, the following description is made with reference to a hash function, e.g., SHA-2.

Each of the blocks 778$_1$, 778$_2$, . . . , 778$_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block 778$_1$ in the blockchain is referred to as the genesis block and includes the header 772$_1$, original file 774$_1$, and an initial value 776$_1$. The hashing scheme used for the genesis block, and indeed in all subsequent blocks, may vary. For example, all the information in the first block 778$_1$ may be hashed together and at one time, or each or a portion of the information in the first block 778$_1$ may be separately hashed and then a hash of the separately hashed portions may be performed.

The header 772$_1$ may include one or more initial parameters, which, for example, may include a version number, timestamp, nonce, root information, difficulty level, consensus protocol, duration, media format, source, descriptive keywords, and/or other information associated with original file 774$_1$ and/or the blockchain. The header 772$_1$ may be generated automatically (e.g., by blockchain network managing software) or manually by a blockchain participant. Unlike the header in other blocks 778$_2$ to 778$_N$ in the blockchain, the header 772$_1$ in the genesis block does not reference a previous block, simply because there is no previous block.

The original file 774$_1$ in the genesis block may be, for example, data as captured by a device with or without processing prior to its inclusion in the blockchain. The original file 774$_1$ is received through the interface of the system from the device, media source, or node. The original file 774$_1$ is associated with metadata, which, for example, may be generated by a user, the device, and/or the system processor, either manually or automatically. The metadata may be included in the first block 778$_1$ in association with the original file 774$_1$.

The value 776$_1$ in the genesis block is an initial value generated based on one or more unique attributes of the original file 774$_1$. In one embodiment, the one or more unique attributes may include the hash value for the original file 774$_1$, metadata for the original file 774$_1$, and other information associated with the file. In one implementation, the initial value 776$_1$ may be based on the following unique attributes: 1) SHA-2 computed hash value for the original file; 2) originating device ID; 3) starting timestamp for the original file; 4) initial storage location of the original file; and 5) blockchain network member ID for software to currently control the original file and associated metadata.

The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)

b) new storage location for the file c) new metadata identified associated with the file d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use as digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 790 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

What is claimed is:

1. A computer-implemented method for a digital asset transaction, the computer-implemented method comprising:
   linking, by a processor set, a license key for licensed material to a digital wallet to enable a determination that a digital asset stored to the digital wallet was generated using the licensed material;
   responsive to a determination that the digital asset was generated using the licensed material, generating, by the processor set, a smart contract for the digital asset, wherein one or more terms of the smart contract are based, at least in part, on one or more license terms associated with the licensed material, and wherein the smart contract includes smart chain code that writes output of logic operations associated with the one or more license terms to a distributed ledger;
   identifying, by the processor set, a transaction request for the digital asset;
   authenticating, by the processor set, an origin of the digital asset based on the digital wallet linked to the license key for the licensed material; and
   responsive to authenticating the digital asset, executing, by the processor set, the smart contract for the digital asset to write the output of the logic operations associated with the one or more license terms to the distributed ledger to enforce the one or more license terms.

2. The computer-implemented method of claim 1, wherein the one or more license terms include one or more licensing tiers.

3. The computer-implemented method of claim 1, wherein authenticating the digital asset further comprises:
   determining a first hash for a first digital asset;
   determining a second hash for a second digital asset;
   determining the first hash for a first digital asset and the second hash for a second digital asset are identical;
   determining a first timestamp for the first hash for the first digital asset is earlier than a second timestamp for the second digital asset; and
   validating ownership of the first digital asset based on determining the first timestamp for the first digital asset has an earlier timestamp than the second timestamp for the second digital asset.

4. The computer-implemented method of claim 1, further comprising:
   determining a royalty based on the smart contract; and
   collecting the royalty upon execution of the transaction.

5. The computer-implemented method of claim 1, wherein authenticating the digital asset was generated using the licensed material is further based, at least in part, on determining a private key corresponding to the digital wallet with the digital asset.

6. The computer-implemented method of claim 1, further comprising:
   storing the license key on the distributed ledger for the licensed material; and
   retrieving the stored license key from the distributed ledger for the licensed material.

7. A computer program product for a digital asset transaction, the computer program product comprising one or more computer readable storage media and program instructions stored on the one or more computer readable storage media, the program instructions to cause a processor set to:
   link a license key for licensed material to a digital wallet to enable a determination that a digital asset stored to the digital wallet was generated using the licensed material;
   responsive to a determination that the digital asset was generated using the licensed material, generate a smart contract for the digital asset, wherein one or more terms of the smart contract are based, at least in part, on one or more license terms associated with the licensed material, and wherein the smart contract includes smart chain code that writes output of logic operations associated with the one or more license terms to a distributed ledger;
   identify a transaction request for the digital asset;
   authenticate an origin of the digital asset based on the digital wallet linked to the license key for the licensed material; and
   execute, in response to authenticating the digital asset, the smart contract for the digital asset to write the output of the logic operations associated with the one or more license terms to the distributed ledger to enforce the one or more license terms.

8. The computer program product of claim 7, wherein the one or more license terms include one or more licensing tiers.

9. The computer program product of claim 7, wherein authenticating the digital asset further comprises instructions to:
   determine a first hash for a first digital asset;
   determine a second hash for a second digital asset;
   determine the first hash for a first digital asset and the second hash for a second digital asset are identical;
   determine a first timestamp for the first hash for the first digital asset is earlier than a second timestamp for the second digital asset; and
   validate ownership of the first digital asset based on determining the first timestamp for the first digital asset has an earlier timestamp than the second timestamp for the second digital asset.

10. The computer program product of claim 7, further comprising instructions to:
   determine a royalty based on the smart contract; and
   collect the royalty upon execution of the transaction.

11. The computer program product of claim 7, wherein authenticating the digital asset was generated using the licensed material is further based, at least in part, on determining a private key corresponding to the digital wallet with the digital asset.

12. The computer program product of claim 7, further comprising instructions to:

store a licensing key on a distributed ledger for the licensed material; and retrieve the stored license key from the distributed ledger for the licensed material.

13. A computer system for a digital asset transaction, comprising:

one or more computer processors;

one or more computer readable storage media;

program instructions stored on the one or more computer readable storage media to cause the one or more processors to:

link a license key for licensed material to a digital wallet to enable a determination that a digital asset stored to the digital wallet was generated using the licensed material;

responsive to a determination that the digital asset was generated using the licensed material, generate a smart contract for the digital asset, wherein one or more terms of the smart contract are based, at least in part, on one or more license terms associated with the licensed material, and wherein the smart contract includes smart chain code that writes output of logic operations associated with the one or more license terms to a distributed ledger;

identify a transaction request for the digital asset;

authenticate an origin of the digital asset based on the digital wallet linked to the license key for the licensed material; and execute, in response to authenticating the digital asset, the smart contract for the digital asset to write the output of the logic operations associated with the one or more license terms to the distributed ledger to enforce the one or more license terms.

14. The computer system of claim 13, wherein the one or more license terms include one or more licensing tiers.

15. The computer system of claim 13, wherein authenticating the digital asset further comprises instructions to:

determine a first hash for a first digital asset;

determine a second hash for a second digital asset;

determine the first hash for a first digital asset and the second hash for a second digital asset are identical;

determine a first timestamp for the first hash for the first digital asset is earlier than a second timestamp for the second digital asset; and validate ownership of the first digital asset based on determining the first timestamp for the first digital asset has an earlier timestamp than the second timestamp for the second digital asset.

16. The computer system of claim 13, further comprising instructions to:

determine a royalty based on the smart contract; and collect the royalty upon execution of the transaction.

17. The computer system of claim 13, wherein authenticating the digital asset was generated using the licensed material is further based, at least in part, on determining a private key corresponding to the digital wallet with the digital asset.

\*     \*     \*     \*     \*